United States Patent [19]

MacKay

[11] Patent Number: 5,112,390

[45] Date of Patent: May 12, 1992

[54] REPLACEABLE CORE SILVER RECOVERY EQUIPMENT AND METHOD OF MAKING AND USING

[75] Inventor: Michael T. MacKay, Sandy, Utah

[73] Assignee: Pioneer Refining Services, Inc., Salt Lake City, Utah

[21] Appl. No.: 624,172

[22] Filed: Dec. 7, 1990

[51] Int. Cl.⁵ .............................................. C22B 3/02
[52] U.S. Cl. ...................................... 75/733; 75/713; 266/170; 29/163.7
[58] Field of Search .................. 29/163.6, 163.7, 163.8; 266/170; 75/713, 733

[56] References Cited

U.S. PATENT DOCUMENTS

| | | | |
|---|---|---|---|
| 3,630,505 | 12/1971 | MacKay | 266/22 |
| 3,692,291 | 9/1972 | MacKay | 266/22 |
| 3,744,995 | 7/1973 | MacKay . | |
| 3,840,217 | 10/1974 | MacKay | 266/22 |
| 4,130,273 | 12/1978 | Woog | 266/79 |
| 4,240,617 | 12/1980 | MacKay | 266/170 |
| 4,441,697 | 4/1984 | Peterson et al. | 266/170 |
| 5,026,029 | 6/1991 | Peterson | 266/170 |

OTHER PUBLICATIONS

Apr. 1968 Bureau of Mines Report of Investigations 7117, "Silver Recovery from Waste Photographic Solutions by Metallic Displacement".

Primary Examiner—Melvyn J. Andrews
Attorney, Agent, or Firm—Lynn G. Foster

[57] ABSTRACT

Equipment and methods for an efficient, low cost silver recovery apparatus for recovering silver from a silver-containing solution. The apparatus comprises a replaceable silver recovery subassembly, stackable container, lid, lock ring which is locked or sealed to make the container tamperproof, and an L-shaped connector by which an anodic silver reducing, hollow core metal coil in the replacement subassembly is releasibly connected to an effluent port of the recovery apparatus. The silver recovery subassembly comprises a mesh bag which is a carrier of the metal coil and containment filter for influent sludge and particulates produced during silver reduction. The mesh bag, with support by the container and lid provides a capturing net for incoming sludge as well as particulates which form during the silver reduction process. The top and bottom of the metal coil is sealed to permit only transverse flow of liquid through the sides of the coil and walls of the hollow core to produce a maximum path length for liquid across the metal matrix of the coil. The L-shaped connector comprises an orthogonal tubular path which insertably connects the core of the coil with the effluent port of the apparatus, said connection being height adjustable to provide a level upper horizontal leg for unimpeded effluent flow and for assured placement of an aperture or slit at the top of the horizontal leg which provides an emergency outlet when the coil and other fluid pathways are obstructed.

22 Claims, 4 Drawing Sheets

REPLACEABLE CORE SILVER RECOVERY EQUIPMENT AND METHOD OF MAKING AND USING

FIELD OF INVENTION

This invention relates generally to silver recovery and more particularly to metallurgic displacement silver recovery equipment and methods which utilize a replaceable anodic metallic coil apparatus.

DESCRIPTION OF RELATED ART

Recovering of silver by metallic displacement is well known in the art. The technique most commonly used for small systems which usually require lower cost initial investment involves metallurgic displacement. Current art involves passing of solutions containing silver salts through packed steel wool, small cut pieces of metallic screen, or continuous metallic screens, commonly formed into helically wound coils, the latter two being made from a metal anodic to silver and tightly packed to provide a high surface contact fluid path. Utilization of a particular selected technique or system is most often determined by the factors of cost of core replacement and recovery efficiency.

Use of steel wool fibers which are small and readily dissolved by the solution has declined due to lack of resistance to corrosion caused by the fixing solution and resulting large openings which develop in the steel wool and allow fixing solution, thereafter, to flow through the openings rather than across surfaces of the remaining packed steel fibers as fluid flow follows the path of least resistance. Use of wire screen cut into pieces has also declined due to expensiveness of preparing cut screen. More recent development activity has involved metal wound matrices of metallic screens which form a silver replacing coil. Such art is more closely related to this invention.

Axially wound coils of metal screen which precipitate silver in exchange for the metal of the woven matrix, without clogging the cell are disclosed in U.S. Pat. Nos. 3,630,505 and 3,744,995, filed Mar. 9, 1970 by Byron R. MacKay. The axially would coils are transversely pervious and substantially prevent axial flow of solution therein by a seal disposed on the top and a pressure fit on the bottom. A relatively expensive liquid connector, providing two way flow and an overflow bypass should clogging occur in the axially wound coils, is disposed vertically providing passage in and out of the top.

An earlier patent, U.S. Pat. No. 3,692,291, filed Aug. 26, 1970, by this inventor Michael T. MacKay, discloses equipment and methods for metallurgic recovery of silver using a woven matrix element in a cylindrical container comprising separate influent and effluent ports through a top lid. The lid and container so disclosed are plastic with sealant composition disposed therebetween. The influent and effluent ports are press fit through sealed apertures on the top of the container. Axial flow in the hollow cylindrical woven matrix element is prevented by separate impervious covers.

A second earlier patent by this inventor, U.S. Pat. No. 3,840,217, filed Nov. 2, 1973, discloses a plastic container with a press-fit lid for metallurgic displacement within a metal fabric coil. Rotatable T-connectors above the lid are selectively set to direct influent and effluent liquid to and from the container in a plurality of directions. A U-shaped transparent emergency overflow tube joins the two T-connectors which present watertight interrelated fittings on each of the lid top. The metal fabric coil is eccentrically disposed within the container upon a retaining pedestal which supports the coil well above the bottom of the container. The influent passage terminates within the container near the bottom of the coil at a baffle.

U.S. Pat. No. 4,202,771 by Robert W. Hoff, filed Dec. 29, 1978, discloses the use of snap connector fittings, a by-pass safety feature comprising an inverted U-shaped tube with a siphon break hole at the vertex. One of the primary objects of Hoff is to provide a chemical recovery filter which can be easily and efficiently replaced.

An ultra-low volume cartridge for processing fixer solutions in the range of ten gallons per month to two gallons per day is disclosed by this inventor in U.S. Pat. No. 4,240,617. A significant object is the provision for a silver recovery tube cartridge having one or more of the following features: (1) small, compact size and volume; (2) adapts coil technology to processing of ultra low volumes of spent photographic solution; (3) completely disposable after use; (4) economical and efficient for ultra-low solution flow rates; (5) provides for facile nontechnical installation, removal, and replacement of consumed parts; (6) usable alone or in tandem; and (7) provides for accurate flow displacement therein.

A Tandem 200 System, currently being sold by Accu-Tech silver Recovery System, 300 North Interstate 35, P.O. Box 3473, Edmond, Okla., 73083-3473, provides two silver recovery compartments connected in tandem in a large divided container. Each compartment comprises a mesh filtering bag which partially surrounds a plating shield which in turn surrounds a plating cell. Influent flow into the first or primary compartment enters via an inlet disposed on a wall of the container above the first cell, superiorly and externally to the filter bag, plating shield, and plating cell. Thus, the mesh filtering bag acts as a filter, removing sludge or particulates which enter the compartment from the inlet before the liquid reaches the plating shield and cell. Flow from the first compartment to the second compartment is also deposited externally to the filtering bag such that any particulates entering either compartment are restricted from access to the inside of the mesh filtering bag and plating cell. Plating cells are replaced by removing the plating shields, which have no bottoms and are directly separated by upward movement, and then lifting the mesh filtering bags with the plating cells therein contained. Any particulates which flow into each compartment are not thereby removed. The Tandem 200 plating cell comprises a wire wound matrix contained in a plastic porous cylinder and a plastic bottom. An elbow is connected to the top of the core of the plating cell which is otherwise water tight. Connection is made from the elbow in the core to an exit orifice in each compartment by a pinch-tube which comprises a length-wise slit. The user is instructed to squeeze the tube for easy insertion of the tube into the elbow and exit orifice. The user is also cautioned to make sure the slit is superiorly disposed when the connection is made. A single secondary or emergency overflow outlet from the container is disposed at the same height as the container inlet orifice. The container can be locked and inlets and outlets are on the side so that containers can be stacked vertically.

Except for the Tandem 200 System, the important issue of capturing or containing silver precipitates and other silver containing sludge which often separate from a plating cell is not taught or suggested in any of the prior related art. The Tandem 200 System is a relatively complex system which comprises a container which surrounds a mesh filtering bag, held upright in place only by an elastic forced friction component between an elastic band at the top of the bag and the plating shield, which the bag surrounds, and a plating cell disposed inside the cylinder of the plating shield. The complexity of the system extends to the disposable plating cell wherein the wire matrix is restrained from unwinding by a porous plastic cylinder and a plastic circular tray in which the wire matrix is disposed. The top of the core of the plating cell comprises a sealed elbow which allows a horizontal connection with an outlet orifice. The Tandem 200 System does not address problems related to capture of influent particulates and sludge nor assuring the superior position of the slit in the pinch-tube.

BRIEF SUMMARY AND OBJECTS OF THE INVENTION

In brief summary, this invention provides a novel silver recovery system and replacement subassembly which affords an inexpensive, easy to install and operate, and efficient silver recovery system and substantially alleviates problems of the related art. Serving an industry which is highly dependent upon equipment cost and efficiency of operation, this surprisingly simple system with its replacement subassembly comprises a securable, stackable container, an easily replaceable silver reduction subassembly which maximizes mean liquid flow path length through an anodic silver reducing metallic-matrix coil and collects, for transport and further processing, substantially all of the influent and reduction process produced sludge and free particulates which are removed and shipped with the replaceable subassembly, and a single adjustable and removable L-shaped connector subassembly by which connection is made between an effluent port and the replaceable subassembly and which provides an emergency outlet for release of liquid and related hydrostatic pressure when flow through a silver reduction coil is obstructed.

The container is cylindrical and comprises a flat bottom and side entry of both influent and effluent ports for ease of stacking multiple units for serial processing and space conservation. A locking ring which seals a lid to the container provides the security of a tamperproof system.

A mesh bag comprising a mesh size which easily passes liquid, but filters small particulates and sludge is used as a carrier for a fresh coil during shipment and installation, as a capturing net during silver reduction processing, and, again, as a carrier for the spent coil and silver reduction byproducts during removal from the system, washing, and shipment for further processing. The integrity of the mesh bag as a filter during silver reduction processing is maintained without additional structure by tension established between the base of the coil, contained therein, and the top of the container where the mesh bag is seized in the connection between the lid and container and held, with the mesh bag walls tautly constrained. An opening in the sides of the mesh bag provides entry for the influent and effluent ports such that no liquid enters the system outside the confines of the mesh bag.

The transversely pervious metallic coil, sized to fit below influent and effluent ports within the container, is contained in the mesh bag continuously throughout shipment and silver reduction. The influent and effluent paths are arranged to steer flow through the metal coil from outside inward to a hollow core where fluid flows upward and outward through a removable L-shaped connector to the effluent port. Except for the connection to the L-shaped connector, the top and bottom of the coil is completely sealed by end plugs and a novel layer of inert sealing material to increase the mean liquid path length across the interacting anodic wire in the coil, thereby achieving maximum silver reduction efficiency.

The L-shaped connector is removable for easy access to the replaceable subassembly and comprises a lower vertical tubular leg which makes a water tight insertion into the core of the coil through a hole in the top plug therein and a tubular orthogonal leg which comprises a split which is longitudinally disposed along the top of the connector when the vertical leg is downwardly disposed. The connection of the L-shaped connector is vertically adjustable, allowing the orthogonal leg to be horizontally disposed when connected to the effluent port, independent of level differences, due to manufacturing tolerances and the like, between the top of the coil and the height of the effluent port in the container. The horizontal disposition of the orthogonal leg provides a level channel for effluent to flow through the trough of the bottom of the orthogonal leg and a level emergency effluent outlet through a level top slit through which liquid escapes the container when the coil or other liquid pathways are obstructed.

Accordingly, it is a primary object to provide an improved, low cost, easy to install and operate silver recovery apparatus and method.

Another important object is to provide a stackable silver recovery apparatus whereby one apparatus stacked upon another for serial processing of the same liquid and conserving floor space.

It is a principal object to provide a low cost metallic coil sealed, except for an effluent pathway from the core of the coil, top and bottom to provide a maximum mean liquid path across interacting anodic wire in the coil.

It is a major object to provide a mesh bag which is a container and carrier of the coil during shipment and silver reduction and which captures substantially all sludge and silver reduction produced particulates from the coil and from liquids which flow into the container for later shipment and processing.

It is a further major object to provide a mesh bag which provides taut filtering sides top to bottom inside the container, except for a limited access aperture wherethrough medially projecting influent and effluent ports project.

It is a consequential object to provide a locking ring by which a lid is releasibly affixed to the container in tamperproof constraint.

It is a significant object to provide a height adjustable connector which provides a liquid communication between the core of the metal coil and the effluent port and which provides an emergency effluent outlet when the metal coil or other liquid pathways are obstructed.

These and other objects and features of the present invention will be apparent from the detailed description taken with reference to accompanying drawings.

BRIEF DESCRIPTION OF THE DRAWINGS

FIG. 3 is an exploded perspective of the silver recovery unit;

FIG. 12 is a fragmentary perspective showing details of a top plug in the core of the silver reduction with a vertical effluent tube delivered through a close fitting hole therein.

DETAILED DESCRIPTION OF THE ILLUSTRATED EMBODIMENT

Figure 1:
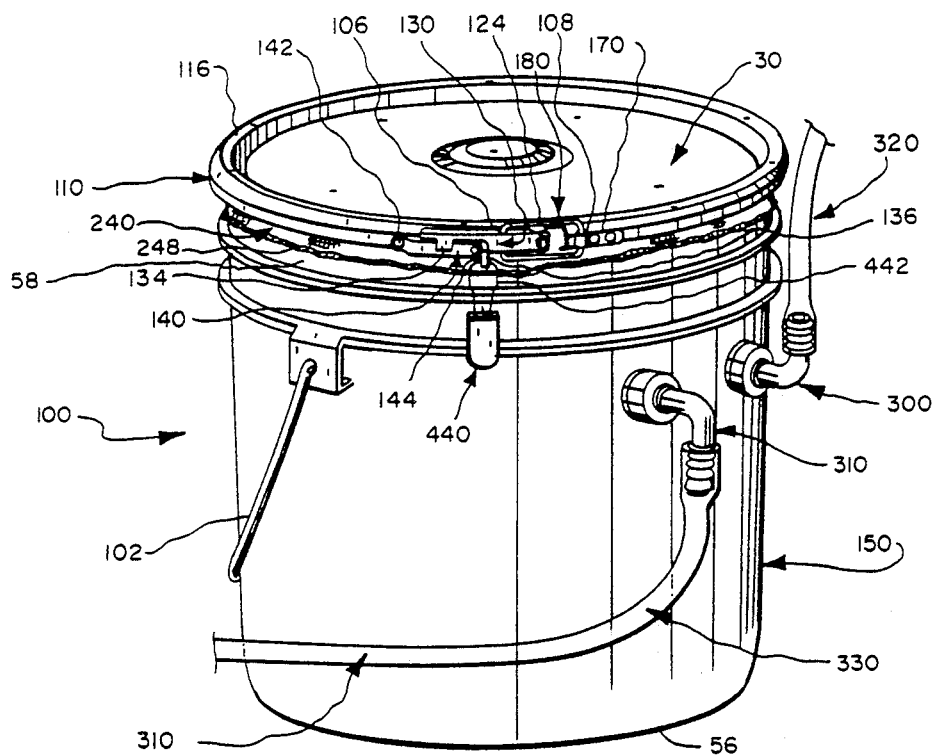
FIG. 1 is a perspective showing a closed and sealed silver recovery unit.

In this description, the term superior is used to indicate a segment of a part or device which is farther from the ground than another segment of a part or device. The term inferior is an antonym of superior. Reference is now made to the embodiments illustrated in FIGS. 1-13 wherein like numerals are used to designate like parts throughout. A completely assembled silver recovery unit is seen in FIG. 1. As seen from the outside, the assembled silver recovery unit, generally designated 100, comprises a locking ring 110, a lid 30, and a bucket 150 which comprises a handle 102, a superior external liquid connection 300, and an inferior external liquid connection 310. The flatness of the lid 30 and bucket bottom 56 and side external connection 300 and 310 provides the opportunity for stacking silver recovery units 100 one above the other for efficient storage and convenient interconnection.

Figure 2:
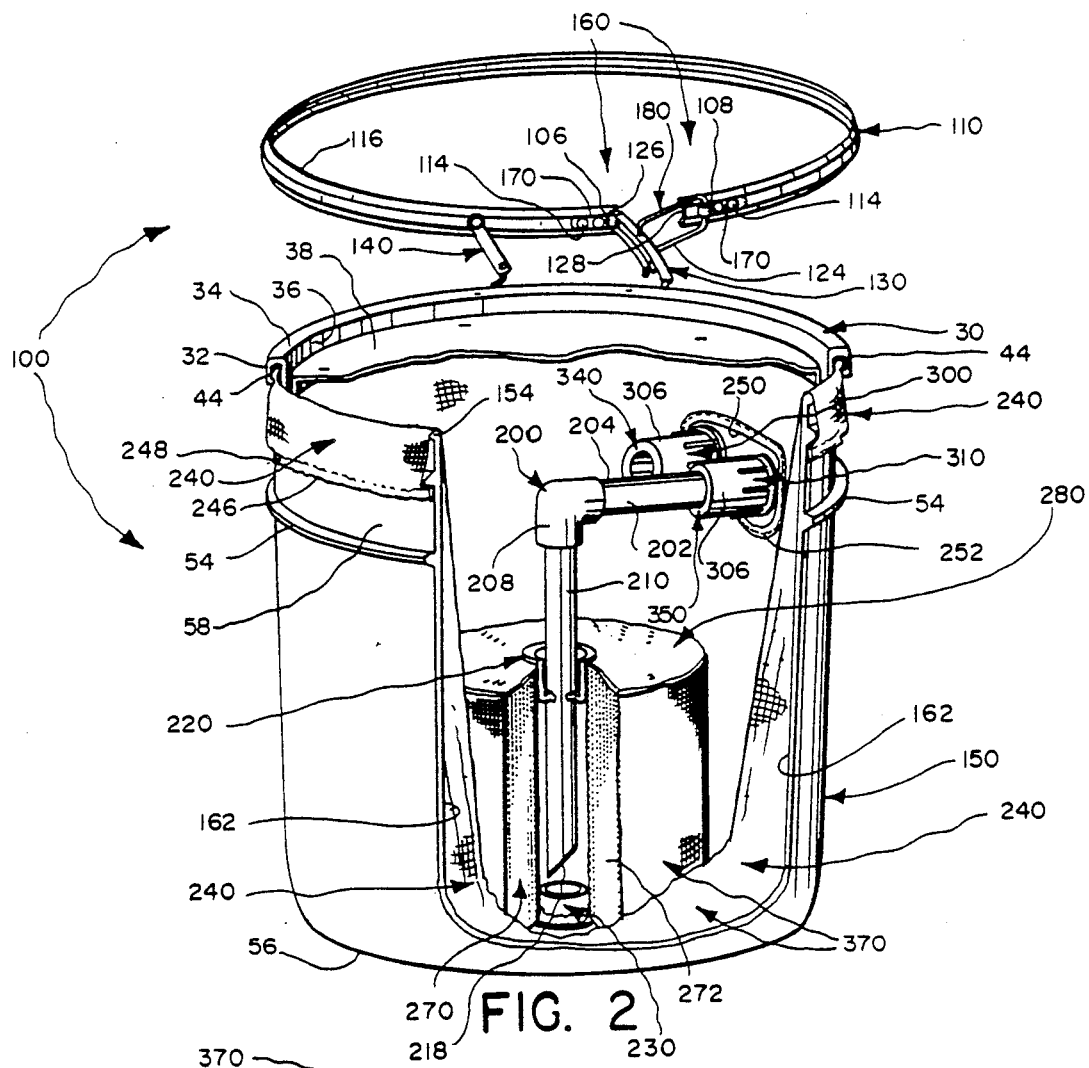
FIG. 2 is a perspective of a closed silver recovery unit, with sections cut away to show the silver reduction subassembly and internally disposed parts otherwise concealed inside a closed assembly with a locking ring in exploded view above the assembly.

Internal parts of each silver recovery unit 100 are seen in FIGS. 2, wherein sections of parts have been cut away for clarity of presentation, and comprise an influent port 340, effluent port 350, silver reduction 270, L-shaped part 200, and mesh bag 240 subassemblies. Each of the mentioned parts and subassemblies will be described in detail hereafter. In this novel invention, the silver reduction subassembly 270, associated mesh bag 240, and L-shaped part are separable subassemblies whereby the silver reduction subassembly 270 and mesh bag 240 comprise a replaceable component 370 which is facilely removed for further processing and replaced by another replaceable component 370 for continuing silver recovery in the same unit 100.

The nature of precious metal recovery warrants the implementation of special measures and to insure the security of the growing accumulation of silver reclaimed over time. Locking ring 110 when placed, latched, and sealed around lid 30 covering bucket 150 provides a secure closure for unit 100. Locking ring 110 comprises a circular steel ring 116 interrupted along two edges 126 and 128 which provide variable separation such that when locking ring 110 is placed around the connecting joint formed by an inverted U-shaped channel 44 which circumscribes lid 30 and a top flange 154 of bucket 150 and drawn tight, locking ring 110 edges 126 and 128 are drawn closely together securely affixing lid 30 to bucket 150. Further, locking ring 110 comprises a locking and sealing mechanism, later described, which provides tamperproof security for the contents of silver recovery unit 100.

As seen in FIGS. 1-4 and 13, locking ring 110 comprises a steel ring 116 opened to form two opposed edges 126 and 128, with a latching and locking mechanism 160 attached proximal to edges 126 and 128. Steel ring 116 comprises a surface which is internally concave and contoured to match the joining contours of lid 30. Proximal to edges 126 and 128 steel ring 116 comprises five mounting holes, described hereafter, whereby a lock arm 140 and a latch 180 are permanently affixed in neighboring relation.

Figures 4, 13:
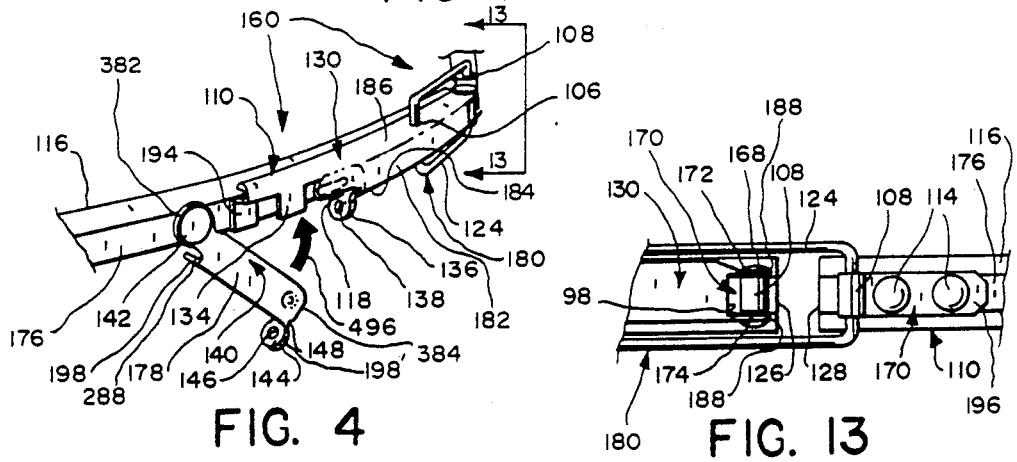
FIG. 4 is a fragmentary perspective of a section of the locking ring showing detail of the latching and locking mechanisms.
FIG. 13 is a fragmentary perspective taken along lines 13—13 of FIG. 4 showing details of attachment of the draw loop and draw arm of the locking ring.

Locking mechanism 160 comprises two components, latch 180, which acts to draw edges 126 and 128 of ring 116 together to bind lid 30 to bucket 150 or, conversely, to separate the edges to release locking ring 110 and allow separation of lid 30 from bucket 150 and locking arm 140 which provides a releasible fastener for draw arm 130 and a tab whereby a lock or seal is secured between latch 180 and locking arm 140. Latch 180 comprises draw arm 130, draw ring 124, and two hingeable attachments 170. Draw arm 130 is seen in the closed position in FIGS. 1 and 4 and in the open position in FIGS. 2 and 3. In the closed or latched position, draw arm 130, preferably formed by stamping and bending to be contoured and curved such that the inner side of the draw arm 130 lies in juxtaposed relation with the outer surface of ring 116, overlays the pouter surface of ring 116. So made, draw arm 130 comprises a raised central segment 182 and two longitudinal edge segments 184 and 186 which are horizontally disposed when attached to an upright bucket 150. At a first end 188 of draw arm 130, central segment 182 is severed along line 98 such that two opposing ears 172 and 174 protrude, as seen in FIG. 13. On the other end, one longitudinal edge 184 is separated from central segment 182 by a distance of approximately three-fourths of an inch in this embodiment although other distances can be used within the scope of the invention, bent along line 118 away from draw arm 130 at a right angle to edge 184 and reduced in length by a circular cut to form tab 136. Within the length of separation of edge 184, at least two tabs 134 and 194 are formed for a purpose to be explained hereafter. Tab 194 is bent such that, when draw arm 130 is juxtaposed against ring 116, tab 194 also lies essentially against the outer surface of ring 116. On the other hand tab 134 is bent such that, when draw arm 130 is juxtaposed against ring 116, tab 134 resides outward from the surface of ring 116 such that locking arm 140 can be rotated to lie between tab 134 and 194.

Each hingeable attachment 170 comprises a single strip of metal folded upon itself such that a tear drop shaped opening 108 is formed at the fold and the two metal layers provide a base 196 consistent with the curvature of the raised surface of central segment 176. Each base 196 comprises two holes for rivets 114 whereby each attachment 170 is permanently affixed to ring 116. Draw ring 124 is made from a strong stress resistant material, preferably steel wire, in the form of a rectangle with the open wire ends lying centrally in juxtaposed relation along one of the short sides of the rectangle. Latch 180 is assembled by affixing a hingeable attachment 170 near each ring end 126 and 128 with each tear drop opening 108 disposed proximal to ring ends 126 and 128 as shown in FIGS. 2 and 13. Each hingeable attachment is permanently affixed to ring 116 by rivets or the like. The continuous short side of draw ring 124 is threaded through the tear drop opening 108 nearest ring end 128 to from a hinged attachment. Each flange 172 and 174 comprises a aperture through which a rivet 168 or the like is threaded and fixed in place to form a hingeable attachment between draw arm 130 and attachment 170 which is attached to ring 116 proximal to ring end 126 as previously described. Each edge segment 184 and 186 comprises a hole 106 whereat a wire end of draw ring 124 is inserted such that, when draw arm 130 is flush against outer surface 176 of ring 116, locking ring 110 firmly restricts separation of lid 30 from bucket 150. However, when draw arm 130 is disposed outward releasing latch 180, the circumferential length of ring 116 is increased whereby locking ring 110 is easily separated from lid 30 and bucket 150.

Lock arm 140 comprises a strip of steel or other essentially unbreakable material which is preferably formed by stamping and bending. As best seen in FIG. 4, lock arm 140 comprises a vertical segment 178 connected by a contiguous right angle bend to a segment 198. Vertical segment 178 extends beyond segment 198 end 288 to form a tab 382. Tab 382 comprises a hole which provides access for an attaching rivet 142 or the like whereby lock arm 140 is rotatably and insertably connected to ring 116. On the other end of lock arm 140 segment 198' extends beyond end 384 of vertical segment 178 to form a tab 144. Tab 144 is bent along line 148 at a right angle to the general plane of segment 198' away from vertical segment 178.

Vertical segment 178 is rotatably connected to ring 116 whereat, when latch 180 is closed, at least a part of vertical segment 178 rotates in the direction shown by arrow 496 to reside between tabs 194 and 134, thereby releasibly affixing latch 180 in a closed position and placing tab 144 in juxtaposed position near tab 136. Tab 144 comprises a first aperture 146 and tab 136 comprises a second aperture 138, both of which are aligned and juxtaposed when vertical segment 178 resides between tabs 194 and 134. A retaining ring or wire 442 of a lock or seal 440 is delivered through apertures 138 and 146 when latch 180 is closed and locking arm 140 resides between tabs 134 and 194 to lock or seal silver recovery unit 100, thus providing security from tampering and undetected product theft.

A locking ring 110, as described, is available in the art, and other locking rings can be used within the scope of the invention.

Lid 30 is best seen in FIGS. 2 and 3. Sized to match and cover bucket 150, lid 30 comprises a U-shaped outer rim or inverted channel 44 which engages a top circular flange 154 to close bucket 150. The U-shaped outer rim 44 comprises a continuous outer vertical flange 32 which is contiguous with a horizontal flange 34 which inwardly connects to another vertical flange member 36. The width of horizontal flange 34 provides a separation of flanges 32 and 36 which compressively fits the horizontal dimension of flange 154 and provides releasible closure and secure attachment when locking ring 110 is in place around lid 30 on bucket 150 and latch arm 130 is closed. Even so, there is sufficient tolerance in the lid 30/bucket 150 connection whereby, when a thin mesh material overlays flange 154, said connection and locking ring 110 attachment is still made as previously described, said use of mesh material being dealt with in further detail hereafter. Centrally, flange member 36 is contiguous with medial cover plate 38. Medial cover plate 38 comprises a series of centrally disposed strengthening ridges and grooves 42 and an otherwise planar surface compatible with the bottom of a superiorly placed bucket 150 for stacking silver recovery units 100.

Bucket 150 comprises a surface of polyethylene or other material which is substantially inert to fixing solution and preferably has a capacity of three and one-half gallons, although buckets of other sizes can be used within the scope of the invention. Selected to be covered and closed and secured by lid 30 and locking ring 110 as previously described, bucket 150 comprises a handle 102 releasibly connected to a molded support 104, a shallow draft angle with essentially smooth upright sides 58 (except for a series of strengthening ribs 54 circumscribing the superior part of the bucket above handle connection 104), and a substantially flat bottom 56 for stacking a plurality of silver recovery units 100, as mentioned earlier. Disposed below the strengthening ribs 54 bucket 150 comprises a superiorly displaced aperture 164 and inferiorly displace aperture 166, both placed superior to the top of a silver reduction subassembly 270 which resides in bucket 150 when silver recovery unit 100 is in use and which will be described in detail hereafter. Matching lid 30 and bucket 150 combinations are available in the art. However, any selected bucket must accommodate smooth walls for apertures 164 and 166 for reasons made apparent hereafter.

The silver reduction subassembly 270 comprises a wound metal coil 272 which is transversely permeable and is comprised of metal which is above silver in the electromotive series. Although several such metals are known that will perform satisfactorily, it has been found that iron in the form of a woven screen matrix is well suited to this use. It is important that as much liquid/metal surface contact as possible be achieved as liquid flows through the metal matrix of coil 272. See FIG. 6. This novel invention achieves the longest possible mean liquid flow path across the exposed metal surfaces by steering liquid which comes from an influent port to exclusively enter coil 272 through the exterior surface 362 of the coil 272 and exit from the core 360 of coil 272.

The forming of a window screen into a suitable silver reduction subassembly 270 is readily accomplished without substantial investment of labor as described in U.S. Pat. No. 3,630,505. The coil is wound to form a hollow core 360 such that fluid flow inhibiting plugs 220 and 230 snugly fit in the openings thereof. Once wound such that the outside diameter of the coil is less than the inside diameter of bucket 150, a fastener in the form of a plastic covered wire 274 is wound around and twisted to firmly restrain each coil 272 from unwinding. Each coil 272 is then separated by cutting, shearing, or the like from the wound section. Each coil 272 is transversely cut into segments slightly shorter than the distance from the bottom of aperture 166 to the bottom of bucket 150 where silver recovery subassembly 270 resides when in use.

A photographic fixing solution inert adhesive such as hot glue is used to cover the top surface 278 and bottom surface 276 of coil 272 to inhibit fluid flow therethrough, forming an impervious cover 280 and 290 thereat such that contacting adhesive surfaces 282 and 292, comprising apertures 284 and 294 and circular edges 286 and 296 comprise matching dimensions to top surface 278 and bottom surface 276, respectively. Cup shaped bottom plug 230 comprises a side wall 236 of substantially the same diameter as core 360 of coil 272 and sealing flange 234. Plug 230, inserted into and affixed to the bottom of core 360 with a photographic fixing solution inert adhesive 232, such as hot glue, in combination with adhesive cover 290 forms a liquid impervious seal across the bottom of silver reduction subassembly 270. Top plug 220 is also cup-shaped and comprises a cylindrical side 256, a base 254, and sealing flange 224. Top plug 220 is similarly affixed to the top of core 360 and, except for an aperture 226 which is formed in base 254. (See FIG. 12.) In combination with cover 280, top plug 220 forms a liquid impervious seal across the top of silver reduction subassembly 270, thereby providing a fluid pathway influent only through exterior side wall 362 to the core 360 to coil 272 where it is effluent through aperture 226.

Figure 7:
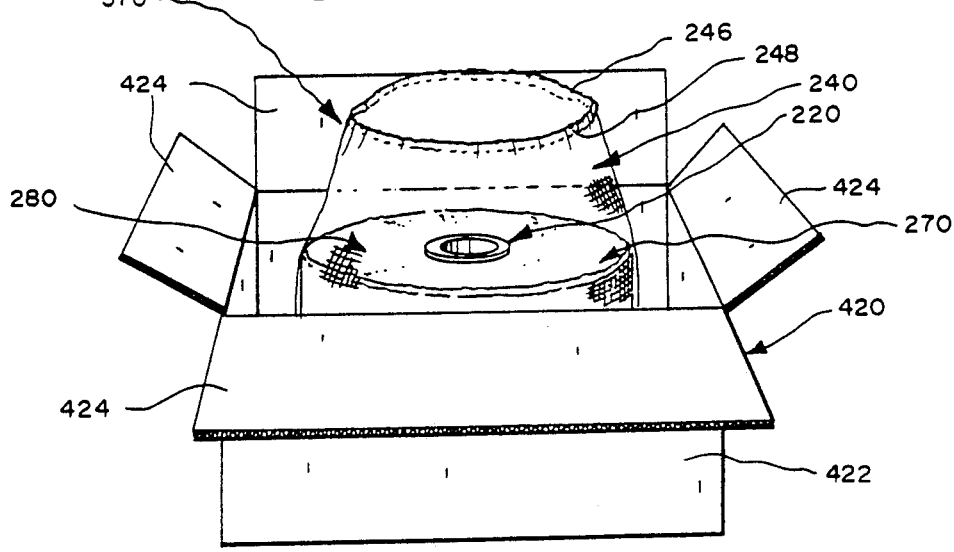
FIG. 7 is a perspective of a shipping container for the silver reduction inside a mesh bag carrier and particulate separator.
Figure 8:
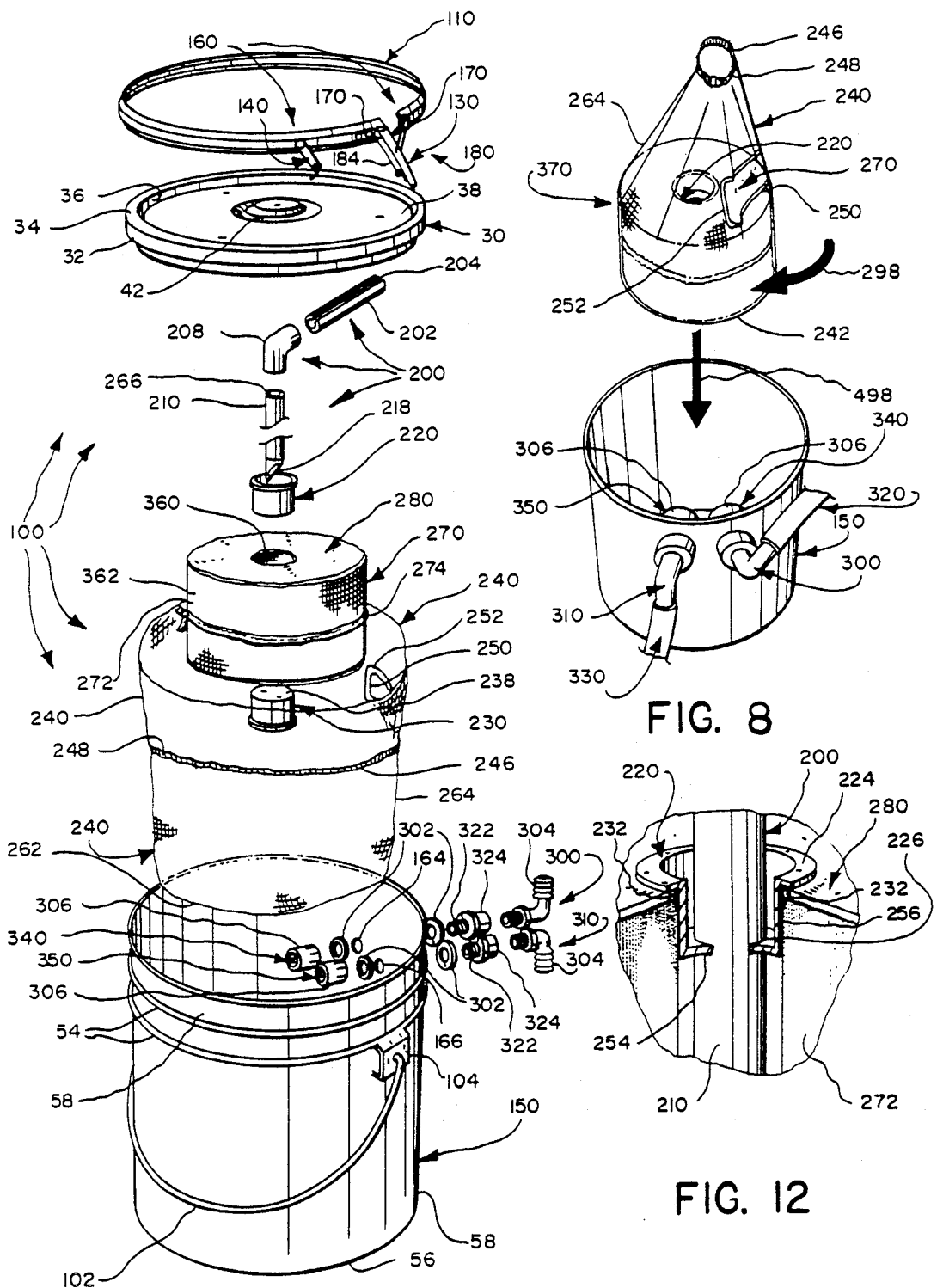
FIG. 8 is schematic showing direction of insertion of the metallic core and enclosing mesh bag into the bucket of the silver recovery assembly.

Complementary to the efficient production of a labor efficient silver reduction subassembly is a mesh bag 240 which serves as a low cost carrier for the silver reduction subassembly 270 and a capturing container for silver containing particulates and sludge. Mesh bag 240 is comprises a photographic fixing solution inert material comprising a mesh size which readily passes liquid, but restricts passage of small particulates such as those produced in a silver reduction process. As seen in FIGS. 7 and 8, bag 240 comprises a flat bottom 262 sewn or otherwise connected to substantially cylindrical sides 264 with an elastic band 248 hemmed or otherwise integrally contained around the top 246. Elastic band 248 draws top 246 inward during shipment and other transport to partially cover and enclose silver recovery subassembly 270. When placed with an associated silver recovery subassembly 270 for use in a bucket 150, mesh bag 240 provides a capturing container for influent particulates, which may be silver containing as well as for particulates produced in the silver reduction process. It is known that some of the reduced silver falls freely from silver recovery subassembly 270 and is recovered in the form of sludge and particulates. For this reason, mesh bag 240 comprises sides which reach from the bottom of the bucket 150 and metallic coil, therein residing, to fully wrap over flange 154 at the top of bucket 150. At installation, bag 240 and silver recovery subassembly 270 is placed into a bucket 150 and bag 240 is pulled upright disposed away from the inside wall 162 of bucket 150 to provide a taut, straight side 264 profile for best liquid transport, therethrough. So positioned and wrapped, elastic band 248 compressively engages side 58 to maintain the side 264 in a taut, stretched relationship until more securely affixed by installation of lid 30 which captures and firmly contains both flange 154 and side 264 of mesh bag 240 in U-shaped channel 44.

To capture influent particles and sludge as well as the particulates produced during silver reduction, mesh bag 240 side 264 comprises a portal 250 for passage of influent port 340 and effluent port 350. Superiorly positioned at a distance above the bottom 262 of bag 240 consistent with the height of influent port 340 and effluent port 350 in bucket 150, portal 250 comprises a strengthening hem 252 circumscribing it periphery.

In combination, as a replaceable unit, mesh bag 240 and enclosed silver recovery subassembly 270 provides a low cost replacement subassembly 370 for silver recovery unit 100, as seen in FIG. 8. A shipping container 420, seen in FIG. 7, comprising vertical sidewalls, of sufficient girth of side walls 422 to contain replacement subassembly 370, and enclosing top flaps 424, which allow container 420 to be sealed for shipment, is used, first, for shipment of an unused replacement subassembly 370 to the site of silver reduction and, second, for shipment of a used replacement subassembly 370 and associated silver containing sludge and particulates, collected in mesh bag 240 during the recovery process, to another site for further processing and silver metal recovery.

As best seen in FIG. 2 and 3, influent port 340 comprises a part, which extends the port medially inward whereby the port inlet into bucket 150 extends through portal 250 and to the inside of an installed bag 240, parts which extend through and seal around aperture 164, and a part which provides angularly adjustable external connection 300 to a hose or the like. Parts used in the currently preferred embodiment of influent port 340, serially connected, from inside to outside, comprise a $\frac{3}{4}$ inch by $\frac{1}{2}$ inch coupling reducer 306, two washers 302 (one disposed on each side of bucket 150 wall 58), a $\frac{1}{2}$ inch male riser 322 threaded into a $\frac{1}{2}$ inch female coupler 324, and a $\frac{1}{2}$ inch ell hose adapter, through other parts can be used within the scope of the invention. These parts are threadably or insertably connected and adhesively sealed where appropriate to provide a water tight seal around aperture 164 in the smooth portion of bucket wall 58. Except for the washers which are made from a pliable material such as rubber, all of these parts are made from a synthetic resinous material, such as polyvinyl chloride, and are essentially inert to photographic fixing solutions.

Effluent port 350 is inferiorly positioned in aperture 166 in bucket 150 relative to aperture 164, but comprises parts which are identical to those used in influent port 340, producing a liquid path from inferior effluent port 350 to inferior external connector connection 310. The inferior position of effluent port 350 to effluent port 340 allows liquid to flow through silver recovery unit 100 exclusively under the influence of gravity, entering through superior external connection 300 and exiting from inferior external connection 310.

Figures 5, 6:
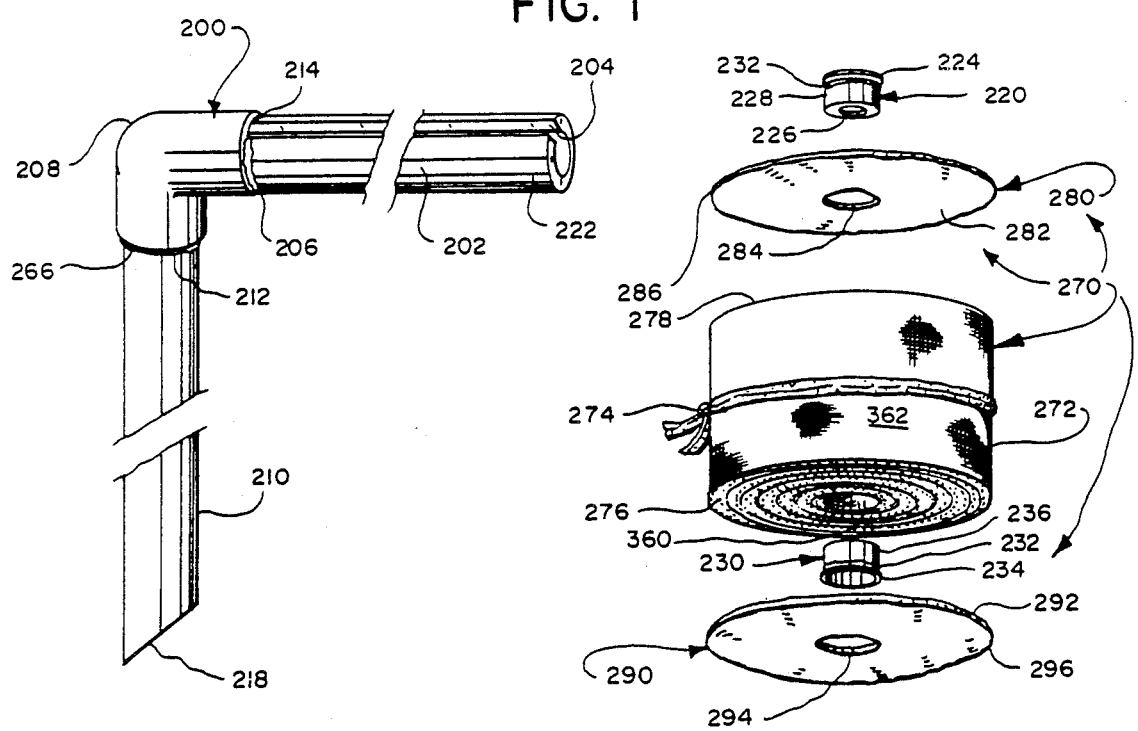
FIG. 5 is a perspective of L-shaped parts which provide the effluent path from the core of the metallic coil to an effluent port.
FIG. 6 is an exploded perspective of the silver reduction subassembly.

Under normal operating conditions, flow from core 360 of silver recovery subassembly 270 is constrained to a pathway provided by L-shaped part 200. L-shaped part 200 releasibly connects core 360 to effluent port 350 by an insertable connection through aperture 226 in the top plug 220 on one end and insertion into coupling reducer 306 on the other. L-shaped part 200 comprises a horizontally disposed nipple 202 which further comprises a lengthwise slit 204, a right angle elbow 208, and a vertically disposed nipple 210, as seen in FIG. 3. Nipple 210 comprises one blunt end 266 and one acutely cut end 218. As seen in FIG. 5, blunt end 266 is inserted and permanently affixed into one port of elbow 208 by an appropriate adhesive 212. Similarly, one end 214 of slit nipple 202 is inserted and permanently connected by an adhesive 206 to the other port of elbow 208 such that slit 204 is in a superior position when nipple 210 is inferior and vertical.

Figures 9, 10:
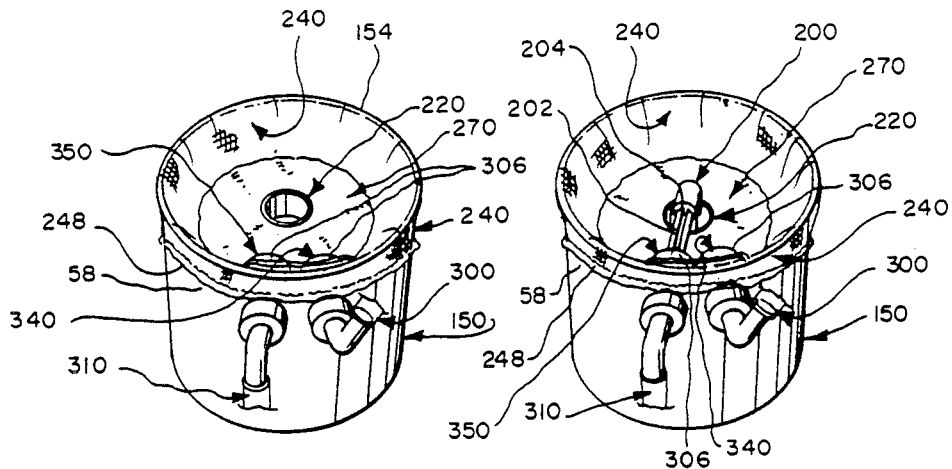
FIG. 9 is a schematic showing positioning of a portal opening in the mesh bag carrier around influent and effluent path connectors.
FIG. 10 is a schematic showing interconnection of parts which provide a path from the core of the silver reduction to the effluent path connector to complete the internal assembly of the silver recovery unit.
Figure 11:
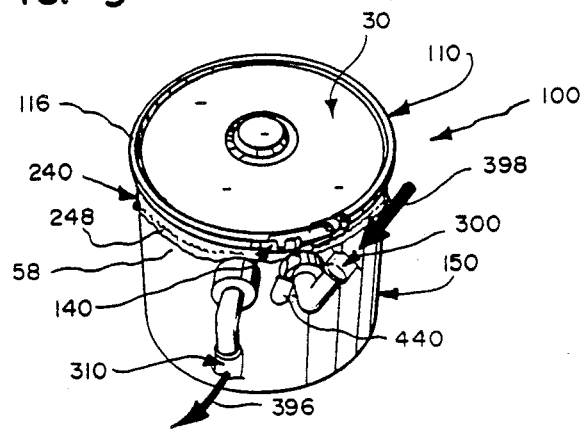
FIG. 11 is a schematic of a completed assembly showing a lid and locking ring in place and sealed.

As shown in FIGS. 7-8, bag 240 and silver recovery subassembly 270 are removed from shipping container 420 as replaceable component 370. To assemble silver recovery unit 100, replaceable component 370 is rotated as indicated by arrow 298 (see FIG. 8) such that portable 250 is aligned with influent and effluent ports 340 and 350, respectively, and lowered into an otherwise empty bucket 150 as indicated by arrow 498. Mesh bag 240 is raised upward and wrapped over flange 154 of bucket 150 and pulled down tightly whereupon elastic band 248 is allowed to engage the side 58 of bucket to hold bag 240 in place with sides 264 pulled taut. Care is taken to assure influent port 340 and effluent port 350 extensions protrude through aperture 250. As best seen in FIGS. 10 and 12, vertical nipple 210 is inserted through aperture 226 in top plug 220 which is sized to provide a first water tight seal at the intersection of aperture 226 and nipple 210. Nipple 210 is driven downward until acutely cut end 218 is approximately ½ inch from solid base 238 of bottom plug 230. L-shaped part 200 is raised or lowered until slit nipple 202 is horizontally disposed when end 222 is inserted into effluent port 350. The top slit 204 being horizontal or level provides an emergency secondary outlet for liquid contained in silver recovery unit 100 when liquid flow through a silver recovery subassembly 270 becomes obstructed. When L-shaped part 200 is assembled the gravity forced normal pathway is complete. Liquid enter from a connecting tube 400 through superior external connection 300, flow inward through influent port 340, circulate downwardly then laterally through sidewall 362 and therethrough coil 272 into core 360, and finally course upwardly through L-shaped part 200 to exit through effluent port 350 to external connection 310. The permanent superior position of slit 204 provides a normal channel for flow through the inferior portion of slit nipple 202 while providing an overflow effluent safety pathway through slit 204.

Lid 30 and then locking ring 110 are serially connected. A lock or seal 440 is installed. If not already connected an influent hose is connected as indicated by arrow 398, and an effluent hose is connected at the base of arrow 396. Silver recovery unit 100 is thus ready for labor free operation receiving silver containing solution from an upstream source through tube 320 and emitting processed liquids to disposal or to a like unit 100 for further serial processing through a tube 330 until the coil 272 is spent and ready for replacement.

To remove a spent silver recovery subassembly 270, the installation process is reversed. Seal or lock 440 is removed. Locking ring 110 is released and removed. Lid 30 is lifted from bucket 150 and L-shaped part 200 is carefully separated from inserted connection with effluent port 350 and top plug 220. Silver recovery unit 100 comprising mesh bag 240 and metallic silver recovery subassembly 270 is lifted from bucket 150, cleaned by rinsing with water, returned to a shipping container 420, and packaged for shipment and further recovery processing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A securable, stackable silver recovery apparatus accommodating gravity forced fluid flow therethrough, said apparatus comprising:

container means comprising a bucket and a lid, the bucket and the lid respectively comprising synthetic resinous material inert to photographic fixing solutions, the bucket comprising a closed bottom wall, an imperious sidewall, effluent port means and influent port means each disposed in the sidewall, and top edge means which define a large opening for receiving the lid the lid being sized and shaped to releasibly close the large opening, said edge means and lid together comprising opposed mating male-female press-fit means adjacent to the large opening for releasibly connecting the lid to the bucket;

thin mesh means inert to photographic fixing solutions comprising openings therein sized and spaced to pass liquids but which openings restrict passage of fine particulates of sludge from a silver reduction chemical reaction, the mesh means comprising a bag comprising a hollow interior and a top edge portion at an opening in the bag, the top edge portion being interposed between the press-fit means to hang the bag within the bucket;

the mesh means further comprising first and second portal means aligned and in fluid flow communication respectively with the influent port means and effluent port means into the hollow interior of the bag whereby the particulates are collected in the hollow interior of the bag;

a hollow cylindrical coil comprising transversely pervious exchange material, the coil being contained in the hollow interior of the bag adjacent the bottom wall of the bucket, said coil providing a plurality of pathways along which silver is reduced from silver containing photographic fixing solutions, said coil further comprising:

top surface means and bottom surface means and a longitudinally directed hollow center vertically disposed in the mesh means;

top and bottom plug means which respectively snugly fit into the hollow center of the coil adjacent to the top surface means and bottom surface means to substantially restrain flow of liquid to substantially flow through the plurality of pathways, the top plug means comprising an aperture which accommodates flow of liquid therethrough;

top and bottom sealing means which cover the top surface means and the bottom surface means, the top and bottom sealing means comprising insoluble impervious means which restrict the flow of liquid therethrough;

liquid flow connection means which releasibly connect the effluent port means through the second portal means to the hollow interior of the bag to form a liquid path, said connection means comprising L-shaped hollow tubular means comprising:

a horizontal tube which connects to the effluent port means and comprises a superiorly positioned longitudinal slit along the top thereof through which liquid drains when the liquid level in the bucket exceeds that of the top of the horizontal tube thereby providing an emergency fluid outlet;

a vertical tube spanning in liquid flow relation between the aperture in the top plug means and the horizontal tube;

the influent port means being disposed at an election above the horizontal tube.

2. The apparatus according to claim 1 wherein said influent port means and effluent port means respectively comprise at least one outwardly extending connection means for liquid flow connection external of the bucket.

3. The apparatus according to claim 1 further comprising retainer means comprising releasible latch means whereby the lid is releasibly latched to the bucket.

4. The apparatus according to claim 3 wherein the retainer means comprise seal attachment means which provide a breakable seal guard against undetected intrusion into the container.

5. The apparatus according to claim 3 wherein the retainer means comprise a lock attachment whereby a lock is attached to guard against unauthorized intrusion into the container.

6. The apparatus according to claim 1 wherein said sealing means comprising paraffin.

7. The apparatus according to claim 1 wherein said mesh means comprise cloth mesh means and elastic memory means disposed around the top edge portion at the bag opening whereby the top edge portion is medially constrained at the top edge means when the bag and coil are placed into the container and the upper portion of the bag is drawn outward and downward across the top of the bucket and whereby the elastic memory means draw inwardly at least partially enclosing each coil placed within the confines of the bag when the elastic memory means are not being otherwise constrained.

8. A silver recovery apparatus for recovering silver from silver bearing liquids comprising:

container means wherein silver is recovered from photographic fixing solution comprising a sidewall, a bottom wall, top opening side entry effluent port means and influent port means disposed in the sidewall through which the solution flows under the influence of gravity;

container lid means which releasibly close the container means;

a bag comprising thin mesh material of selective permeability interposed and supported by contact between the container means and the container lid means and portal means through which the silver bearing liquids are transported;

silver reduction coil means being disposed within the bag, having a diametrical size less than that of the sidewall of the container means and comprising a top surface, a bottom surface, an outer side surface of a plurality of coiled layers defining transverse flow paths therethrough and a hollow central core;

influent and effluent flow accommodating means accommodating flow of the solution into the container means through the portal means in the bag, transversely between the circumference and the hollow central core of the coil means to precipitate silver sludge and out the container means through the portal means in the bag.

9. The apparatus according to claim 8 wherein one of the influent and effluent flow accommodating means comprise a synthetic resinous plastic tube which is horizontally disposed and connected at one end to the associated port means the horizontal tube comprising a longitudinal slot disposed at the top thereof which provides an emergency outlet for the solution.

10. The apparatus according to claim 8 further comprising retainer means comprising a retaining ring and clasp whereby the container lid means are releasibly locked to the container means.

11. The apparatus according to claim 10 wherein the retainer means comprise seal attachment means which provide a breakable seal guard against undetected intrusion by an unauthorized person into the container means.

12. The apparatus according to claim 10 wherein the retainer means comprise a lock attachment whereby a lock is attached to guard against unauthorized intrusion into the container means.

13. The apparatus according to claim 8 wherein said top surface and bottom surface comprise a covering of sealing material to restrictively define the flow path therethrough from the outer surface to the hollow core.

14. A self contained, replacement subassembly system for a silver recovery apparatus whereby following use the subassembly system is facilely removed from the silver recovery apparatus and containerized for transporting and processing and a fresh, unused subassembly is installed in the apparatus thereafter, allowing essentially continuous use of the recovery apparatus, said subassembly system comprising:

at least one shipping container, which receives, encloses and provides storage and shipping protection for the subassembly, in either a used or an unused state;

coil means comprising a hollow cylindrical coil of transversely pervious exchange material having silver reduction capacity, a generally flat top, a generally flat bottom, sealing material applied to the top and to the bottom, a hollow central core and top and bottom plugging means sealably affixed to plug the hollow central core, said top plugging means comprising an aperture which provides plug-in, liquid tight assembly with a releasibly connected liquid flow conduit means to provide a direct liquid outlet path from the apparatus, said sealing means and plugging means lengthening an otherwise shorter mean flow path along the exchange material between the hollow central core and the periphery of the coil thereby improving the silver reduction efficiency of the coil;

a mesh bag which comprises means for confining the silver reducing coil means, means for defining an elasticized top of the mesh bag, and means for providing side entry into the confining means, the mesh bag thereby providing a handling confinement for the coil means by which the coil means are removed from the shipping container, feed through portals for passage therethrough of conduit means for communicating a liquid through the mesh bag to and from the coil means, a filter previous to liquid for capturing accumulating particulates of silver and silver recovery byproducts from the liquid during silver recovery processing, means by which the bag and the coil means are unitarily placed within and removed from the apparatus so that associated silver and silver recovery by-products stay within the bag after placement in and during removal from the apparatus.

15. A method for manufacturing a replaceable hollow core cylindrical coil for use in silver recovery, comprising the steps of:

providing a wound coil of anodic screen wire comprising a hollow core, a top and a bottom;

constraining the wound coil from unwinding;

imperviously plugging the hollow core at a bottom thereof;

plugging the hollow core at the top thereof with a sleeve comprising an aperture for receipt of a liquid conduit for accommodating flow of liquid the core and the exterior of the coil; and applying a liquid impervious material to cover the top and bottom of the coil to restrict flow to flow between the core and the conduit and between the core and the periphery of the coil between the top and bottom.

16. The method according to claim 15 wherein the step of applying liquid impervious material comprises applying a thermal setting material which is inert to photographic fixing solutions.

17. The method according to claim 16 wherein the step of applying a thermal setting material comprises applying hot glue.

18. A method for manufacturing a silver recovery subassembly for use in silver recovery comprising the steps of:

providing an anodic metal device for use in the silver recovery apparatus by coiling a anodic metal web upon itself to form a coil having a hollow core, a top and a bottom, fastening the coil in its wound state imperviously sealing the bottom end of the coil and the top end of the coil exclusive of the core for limiting the path of liquid which flows through the anodic metal coil during the recovery process, and defining a liquid flow path from the core through the top of the coil at the core;

placing the anodic metal device fully into a mesh bag which is used as a carrier and filter to complete assembly of the silver recovery subassembly, the mesh bag comprising a selectively porous material which is pervious to liquid but restricts passage of and thereby retains particulates which result from the silver recovery process in the confines thereof, an elongated top comprising an elastic bound top opening, and side openings for receiving at least one influent and at least one effluent conduit means for communicating liquids between the interior and the exterior of the bag.

19. A method for placing a silver reducing and capturing subassembly in a silver recovery apparatus from which a previously used locking ring, lid, L-shaped connector, and silver reducing subassembly has been removed, comprising the steps of:

placing an anodic metal coil entirely in a mesh bag;

positioning the coil containing mesh bag above a top opening in a silver recovery container comprising a side wall so that side parts in the mesh bag are aligned with inwardly projecting influent and effluent liquid conduits through the side wall;

lowering the coil containing mesh bag into the container and inserting the inwardly projecting influent and effluent conduits through the mesh bag portal;

placing an upper end adjacent to an open top of the mesh bag outwardly over the side wall at the top opening of the container so as to tensively straighten the mesh bag disposed within the container;

placing a lid over the upper end of the mesh bag to releasibly close the top of the container;

releasibly and sealingly securing the lid to secure the upper end of the mesh bag over the side wall at the top opening of the container while also releasibly closing said top opening;

causing liquid flow to occur only between the core and the top of the coil and the core and layers of the coil to an exterior thereof.

20. A method for removing a subassembly from a silver recovery apparatus comprising the following steps:

unlatching and removing a lid from a closure position at a top opening of a container through which top opening a top lip of a mesh bag, pervious to silver containing liquids but impervious to silver sludge, extends;

disassociating liquid flow conduit means between the container and the interior of the mesh bag where a silver recovery anodic metal coil and silver sludge are disposed;

grasping the top lip of the mesh bag at the top opening of the container and lifting the mesh bag with the anodic metal coil and silver sludge from the container while allowing liquid in the mesh bag to flow by gravity through the bag into the container.

21. A method of recovering silver from silver-containing liquid comprising the steps of:

placing a wound coil of ionic exchange metal into an interior of a selectively pervious mesh bag;

placing the bag with the coil therein in a silver recovery container;

delivering silver containing liquid directly into the interior of the bag and thence selectively through the coil within the bag to obtain silver sludge through ionic exchange;

accommodating flow of said liquid through the bag into the container while accumulating and retaining the silver sludge in the bag.

22. The method according to claim 21 further comprising the steps of:

removing the bag within the accumulated silver sludge and a residual remainder of the coil from the container;

placing a second wound coil of ionic exchanger metal in a second selectively pervious mesh bag;

placing the second bag with the second coil therein in the silver recovery container for receipt of additional silver containing liquid.

* * * * *